(12) United States Patent
Adams

(10) Patent No.: US 7,395,749 B2
(45) Date of Patent: Jul. 8, 2008

(54) PNEUMATIC CYLINDER

(76) Inventor: Michael R Adams, 2259 Canan Way, Prince George, BC (CA) V2K 4A7

(*) Notice: Subject to any disclaimer, the term of this patent is extended or adjusted under 35 U.S.C. 154(b) by 123 days.

(21) Appl. No.: 11/382,913

(22) Filed: May 11, 2006

(65) Prior Publication Data
US 2006/0272497 A1 Dec. 7, 2006

(51) Int. Cl.
*F15B 15/22* (2006.01)
*F01B 3/00* (2006.01)
(52) U.S. Cl. .................. 92/85 B; 92/113; 91/395
(58) Field of Classification Search ............. 92/65, 92/85 R, 85 B, 110, 113; 91/395
See application file for complete search history.

(56) References Cited

U.S. PATENT DOCUMENTS

| | | | |
|---|---|---|---|
| 2,660,984 A | 12/1953 | Zumwalt | |
| 2,961,015 A | 11/1960 | Randall | |
| 3,018,762 A | 1/1962 | Korb | |
| 3,196,753 A | 7/1965 | Maurer | |
| 3,415,159 A | 12/1968 | Homlein et al. | |
| 3,440,930 A | 4/1969 | Olson | |
| 3,678,805 A | 7/1972 | Weyman | |
| 3,727,518 A | 4/1973 | Gooding, Jr. | |
| 3,797,324 A | 3/1974 | Sheesley et al. | |
| 3,805,672 A | 4/1974 | Pekrul | |
| 3,824,897 A | 7/1974 | Bryntse et al. | |
| 3,994,539 A | 11/1976 | Gottlieb | |
| 4,006,666 A | 2/1977 | Murray | |
| 4,355,566 A | 10/1982 | Kaji | |
| 5,115,723 A | 5/1992 | Wang | |
| 5,279,325 A | 1/1994 | Kaspers | |
| 5,285,877 A | 2/1994 | Bonenberger et al. | |
| 5,423,243 A | 6/1995 | Yamashita et al. | |
| 5,517,898 A | 5/1996 | Kim et al. | |
| 5,623,861 A | 4/1997 | Ward et al. | |
| 5,692,429 A * | 12/1997 | Sonntag ................ | 91/395 |
| 6,202,536 B1 | 3/2001 | Harju | |
| 6,279,451 B1 | 8/2001 | Hirano et al. | |
| 6,386,147 B1 | 5/2002 | Fransen | |
| 6,422,349 B1 | 7/2002 | Veletovac | |
| 6,711,984 B2 | 3/2004 | Tagge et al. | |

FOREIGN PATENT DOCUMENTS

| | | |
|---|---|---|
| GB | 1387475 | 3/1975 |
| KR | WO 02/42649 | 5/2002 |

* cited by examiner

*Primary Examiner*—Michael Leslie
(74) *Attorney, Agent, or Firm*—Nexus Law Group LLP; C. Larry Kyle

(57) ABSTRACT

A pneumatic cylinder having a cushioning valve assembly. A tubular body is capped by a pair of cylinder heads. A hollow cylinder rod having a piston assembly and cushioning valve assembly is seated within the tubular body for reciprocating action therein. The piston assembly is formed of a piston having a bore passing longitudinally therethrough and a cylindrical collar. The collar is mounted about the outside of one end of the hollow cylinder rod and the piston caps the end. The cushioning valve assembly comprises an elongated rod having a cushion piston at one end and a head at the other and is seated within the bore of the piston, such that the cushion piston is fitted within the interior of the hollow cylinder rod.

10 Claims, 5 Drawing Sheets

PNEUMATIC CYLINDER

FIELD OF THE INVENTION

The present invention relates to pneumatic cylinders and in particular to a cushioning valve assembly for a pneumatic cylinder.

BACKGROUND OF THE INVENTION

Pneumatic cylinders are used as actuators in a wide variety of applications. At their most basic, they comprise a cylinder tube body having blind (front) and rod (rear) ends and a cylindrical bore travelling from the front to the rear end defining a piston chamber. The blind and rod ends each have inlet-outlet ports for feeding and discharging pressurized air into the bore. A piston assembly seated in the bore is actuated via the inlet-outlet ports, which alternately feed and discharge pressurized air into the bore.

In order to control the speed of the piston at the end of its power stroke and thus limit the wear and tear on the cylinder body, the cylinder is equipped with a cushioning device. In the prior art cylinders, the cushioning device is in the form of a cushion sleeve that is fixed to the cylinder rod. The cushion sleeve sits in a floating cushion seal.

In the first cycle, air is fed into the cylinder through the blind end of the cylinder onto the cushion sleeve and piston assembly. When the pressure has increased to a sufficient level it acts to release the cushion sleeve from the floating cushion seal and the cushion sleeve, piston assembly and cylinder rod are forced down the cylinder bore.

For the return cycle, air is fed into the rod end of the cylinder and vented from the blind end of the cylinder. The pressurized air forces the cylinder rod, piston assembly and cushion sleeve back towards the blind end. At the blind end of the cylinder, the cushion sleeve enters a floating cushion seal that traps air between the blind end of the cylinder and the piston assembly.

While the prior art cushioning sleeve does provide a cushioning effect, it does suffer from several deficiencies. For example, if an exact seal is not made as the cushion sleeve enters the floating cushion seal, the piston assembly will hit the blind end of the cylinder. Furthermore, as the floating cushion seal begins to break down it becomes more difficult to get an exact seal, with the natural result being that the piston assembly hits the blind end of the cylinder more often, eventually causing the cylinder to break. In addition, this type of cushion system creates cylinder bounce. Also, the response time of the cylinder is limited because of the lag time until there is sufficient pressure to release the cushion sleeve from the floating cushion seal.

There is therefore a continuing need for improvement.

SUMMARY OF THE INVENTION

The present invention comprises a pneumatic cylinder having a cushion valve assembly.

According to an embodiment of the invention there is provided a pneumatic cylinder comprising a tubular body having first and second ends and defining an interior chamber, a cylinder rod, a piston assembly and a cushioning assembly. The cylinder rod is hollow and has a piston end and an actuation end. The cylinder rod is fitted through an opening located in the first end of the tubular body with the piston end located within the interior chamber and the actuation end located outside of the tubular body. The piston assembly is connected to the cylinder rod at the piston end and has a bore travelling longitudinally through it. The cushion valve assembly comprises an elongated rod having a head portion and a piston portion at opposed ends. The elongated rod is positioned within the bore for reciprocating action therein and the piston portion is positioned within the hollow cylinder rod.

In another aspect, the piston end of the cylinder rod of the pneumatic cylinder described above has an external threaded surface and an internal threaded surface.

In yet another aspect, the piston assembly comprises a piston and a collar, with the bore travelling longitudinally through the piston, and the collar having an internally threaded surface adapted to be threadingly connected to the external threaded surface of said cylinder rod.

In yet a further aspect, the piston has a head and a neck, with the neck being threaded and adapted to be threadingly connected to the internal threaded surface of the cylinder rod.

In yet another aspect, the collar is in abutment with the piston, the collar being proximal to the actuation end of the cylinder rod as compared to the piston.

In yet another aspect, the second end of the tubular body has a recess and the head portion of the elongated rod is adapted to fit within the recess to form a seal.

According to an alternative embodiment of the invention there is provided a pneumatic cylinder having a tubular body with first and second ends and defining an interior chamber. The first end of the body has an opening through which a hollow cylinder rod travels. The hollow cylinder rod has a piston at one end, the piston having a bore travelling longitudinally therethrough and adapted to be seated in the interior chamber for reciprocating action therein to move the cylinder rod back and forth through the opening in the tubular body. A cushion valve assembly comprising an elongated rod having a head portion and a piston portion at opposed ends is operatively connected to the piston for cushioning contact of said piston with the second end of the tubular body.

According to a further alternative embodiment of the invention there is provided a cushion valve assembly for use in a pneumatic cylinder having a hollow cylinder with a piston having a bore therethrough for cushioning impact of the piston with an end of the pneumatic cylinder. The cushion valve assembly comprises an elongated rod having a head portion and a piston portion at opposed ends, wherein the cushion valve assembly is operatively connected to said piston for cushioning contact of said piston with an end of said tubular body.

In another aspect of the embodiment of the cushion valve assembly described above, the piston portion is adapted to be positioned within the hollow cylinder. Furthermore, the elongated rod is sized to fit within the bore of the piston for reciprocating action therethrough. In addition, the head portion is adapted for contact with the end of the pneumatic cylinder to form a seal.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DETAILED DESCRIPTION

Figure 1:
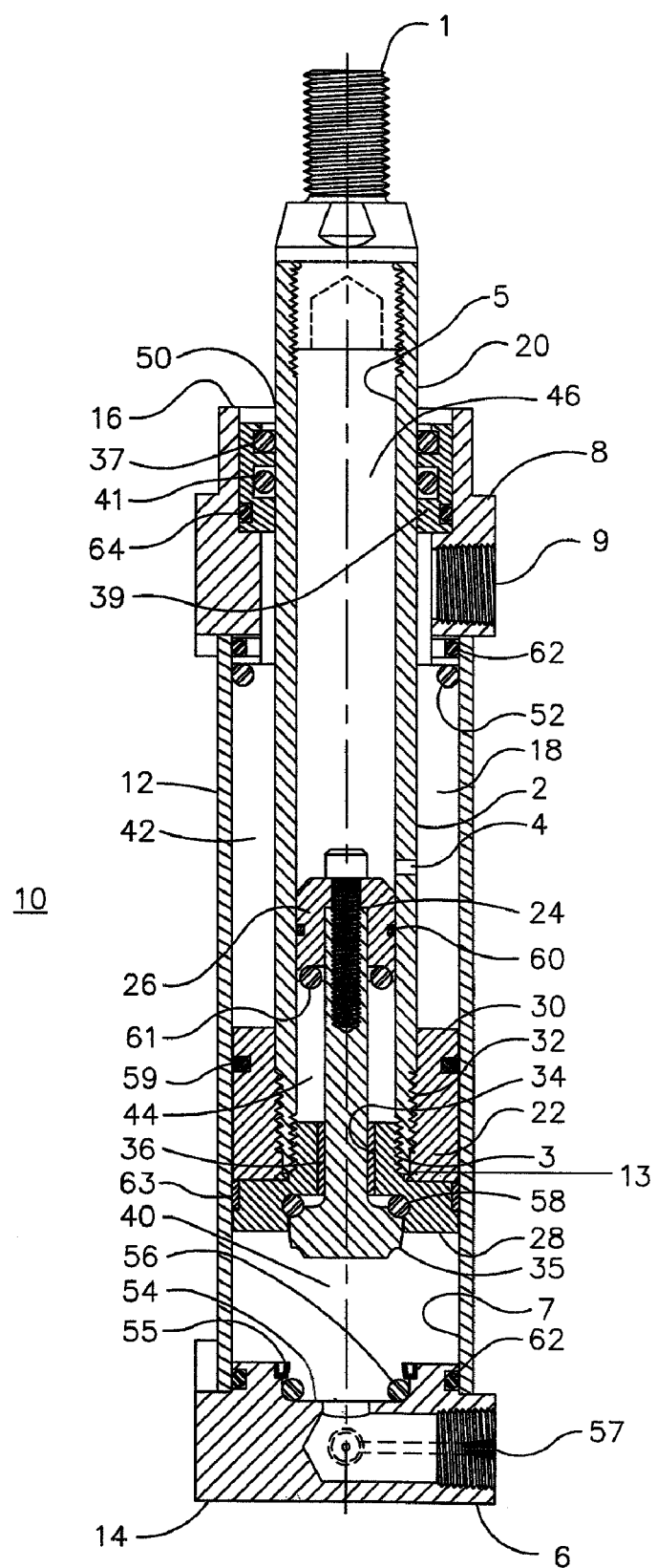
FIG. 1 is a partial cross-sectional view of a preferred embodiment of a pneumatic cylinder having a cushion valve assembly.

The preferred embodiment of a pneumatic cylinder according to the invention generally referred to as reference numeral 10 is best illustrated in FIG. 1.

Referring to FIG. 1, it can be seen that the pneumatic cylinder 10 generally comprises a tubular body 12 defining a cylindrical chamber 18 bounded by a pair of cylinder heads 6, 8 located at a blind end 14 and a rod end 16, respectively. A reciprocable hollow cylinder rod 20 equipped with a piston assembly 22 and a cushion valve assembly 24 is actuatable by way of pressurized air so as to extend from, and retract into, cylindrical chamber 18.

The blind end cylinder head 6 is preferably connected to the tubular body 12 by way of tie rod bolts 72 (shown in FIG. 5) and has an air supply port 57 and a central bore 54 having an o-ring 56 seated therein and a lip seal 55. A barrel seal o-ring 62 between the inner wall 7 of the tubular body and a portion of the cylinder head 6 ensures an airtight seal.

The rod end cylinder head 8 is fitted with a gland bushing 39 and seal 64. The gland bushing has a wiper 37 and a lip seal 41. The cylinder head 8 is connected to the tubular body 12, with a barrel seal o-ring 62 ensuring a tight seal between the cylinder head 8 and the inner wall 7 of the tubular body. Cylinder head 8 has a longitudinally disposed cylindrical opening 50 passing therethrough and is also provided with an air supply port 9 for feeding and releasing pressurized air into cylindrical chamber 18.

The reciprocable hollow cylinder rod 20 has an actuation end 1 and a piston end 13 and extends through cylindrical opening 50. Lip seal 41 ensures a tight seal between the cylinder rod 20 and the gland bushing 39. The o-ring 64 ensures a tight seal between gland bushing 39 and cylinder head 8 so that no gases may escape from within chamber 18. Wiper 37 ensures no dust enters the chamber 18. The piston end 13 of the hollow cylinder rod 20 is positioned within the cylindrical chamber 18 and is provided with a threaded outer surface 32 and a threaded inner surface 3. A pilot hole 4 is located in the side wall 2 of the hollow cylinder rod 20 for allowing air to pass therethrough. The piston assembly 22 connected to the cylinder rod 20 separates cylindrical chamber 18 into a blind end (first) chamber 40 and a rod end (second) chamber 42. The cushion valve assembly 24 (best shown in FIG. 2) is operatively connected to piston assembly 22 and has a cushion valve piston 26 that separates the interior of hollow cylinder rod 20 into a third chamber 44 and a fourth chamber 46.

Figure 2:
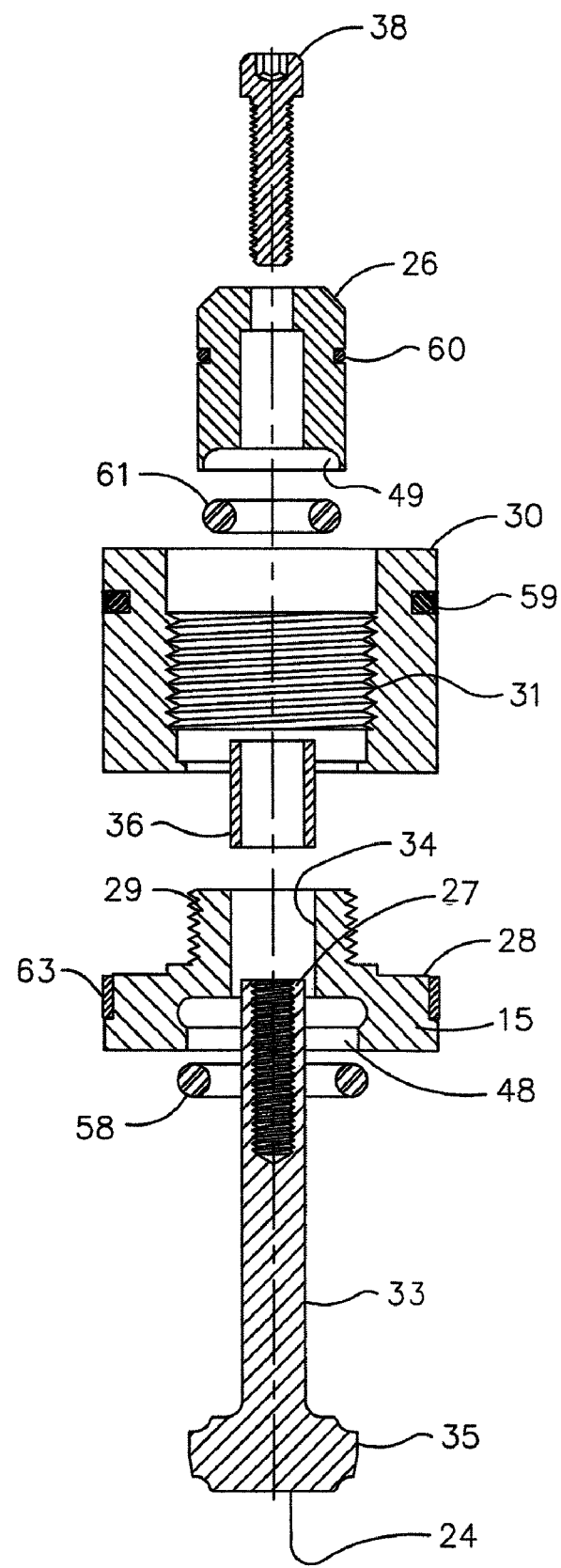
FIG. 2 is an exploded cross-sectional view of the components of the cushion valve assembly shown in FIG. 1.

The piston assembly 22 and the cushion valve assembly 24 will now be described in greater detail by reference to FIGS. 1 and 2. The piston assembly 22 has a main piston or first portion 28 and a collar or second portion 30. The collar 30 is preferably in the form of an open-ended cylinder having a threaded inner wall 31 (as seen in FIG. 2) adapted to be threadingly connected to the threaded outer surface 32 of the cylinder rod 20, as shown in FIG. 1. The collar is sized to fit within cylindrical chamber 18 and has a cushion valve piston seal 59, which ensures an airtight seal between collar 30 and the inner wall 7 of tubular body.

Piston 28 has a head 15, a neck 29 and a bore 34 passing longitudinally therethrough. A valve stem bushing 36 is press-fitted into bore 34. A cylindrical recess 48 is centrally located in the head 15 of the piston 28. An O-ring 58 is seated in recess 48. At the opposite end of piston 28, the threaded neck 29 is adapted to be threadingly connected to the threaded inner wall 34 of the cylinder rod 20. The head 15 has a diameter corresponding to the diameter of the inner wall 7 of the tubular body 12 so as to form a snug fit and is equipped with a wear ring 63.

The cushion valve assembly 24 comprises a valve stem (rod) 32 having a cushion valve (or head) 35 at one end and an internally threaded end 27 at the other, a cushion valve piston 26 and a cushion piston mounting bolt 38. Valve stem 33 is sized so as to fit within, and pass longitudinally through, the valve stem bushing 36. Preferably the diameter of the valve stem 33 is 0.001 inches smaller than the diameter of the valve stem bushing 36. Because there is no seal between the valve stem 33 and valve stem bushing, there is a minimal amount of air loss between the two. After the valve stem has been inserted through the valve stem bushing 36 fitted within the bore 34 of piston 28, the cushion valve piston 26 is connected to the valve stem by way of the bolt 38, which is adapted to be threadingly connected to internally threaded end 27.

Cushion valve piston 26 is adapted to fit snugly within the hollow cylinder rod 20. A cushion piston seal 60 located in a circular recess about piston 26 ensures an airtight seal between cushion valve piston 26 and the inner wall 5 of the cylinder rod 20. Cushion valve 35 is sized and shaped so as to correspond to, and fit tightly within, the cylindrical recess 48 and central bore 54. An o-ring 58 is fitted within recess 48 to reduce the impact when cushion valve 35 is forced into recess 48. O-ring 61 is fitted into recess 49 in cushion valve piston 26 so as to reduce the impact when cushion valve piston 26 is forced into contact with the neck 29 of piston 28. A further O-ring 56 seated within central bore 54 provides cushioning when cushion valve 35 is forced into bore 54. When seated in bore 54, cushion valve 35 forms an airtight seal with lip seal 55.

Once the collar 30 is connected to the cylinder rod 20 and the cushion valve assembly 24 is assembled with the piston 28, piston 28 may then be connected to the cylinder rod 20. Preferably, during assembly a synthetic thread locker is used to connect the collar 30 and piston 28 to the cylinder rod. Once connected to the cylinder rod 20, piston 28 and collar 30 are in abutment with one another. Once the cylinder rod 20, piston assembly 22 and cushion valve assembly 24 have been operatively connected, the pneumatic cylinder can be assembled.

Figure 5:
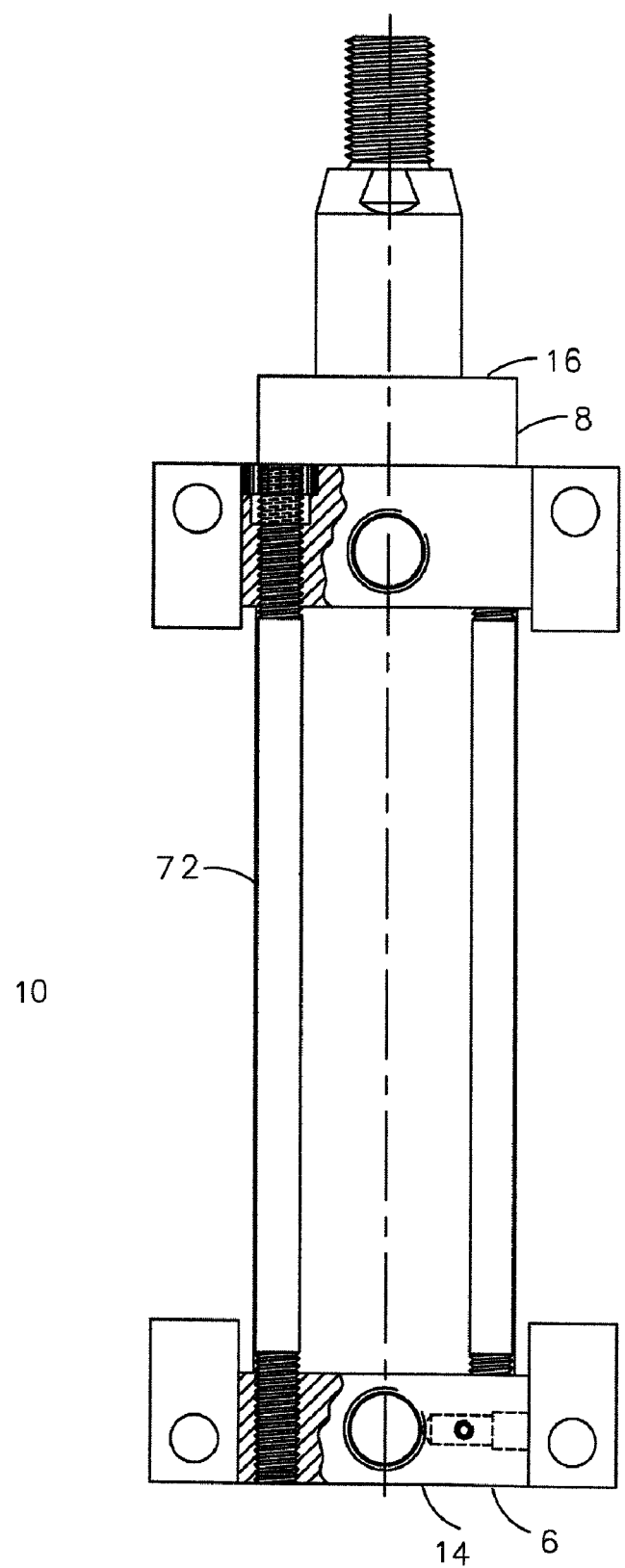
FIG. 5 is a partial cross-sectional view of the cylinder of FIG. 1 showing the tie rod bolts.

Assembly of the pneumatic cylinder is accomplished by connecting the blind end cylinder head 6 to the tubular body 12 by way of tie bolts 72. The piston end 13 of the cylinder rod 20 equipped with the piston assembly 22 and cushion valve assembly 24 is inserted into cylindrical chamber 18. The rod end cylinder head 8 is connected to the tubular body 12 by way of a plurality of tie rod bolts 72 as shown in FIG. 5 with the cylinder rod extending out through cylindrical opening 50.

Preferably an O-ring 52 or other cushioning type element such as a belleville washer or the like is positioned within the second chamber 42 in abutment with the cylinder head 8 at rod end 16. The piston bumper 52 provides cushioning when collar 30 comes into contact with it during actuation of the piston as described below.

Figure 3A:
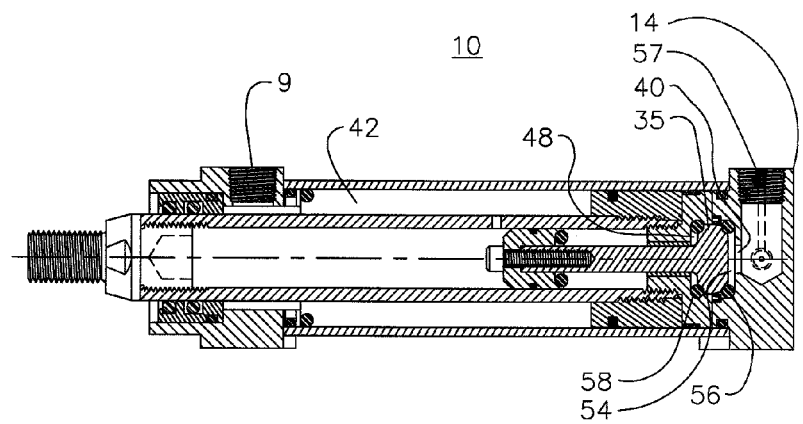
FIG. 3a is a partial cross-sectional view of the cylinder shown in FIG. 1 at the start of the extend cycle.
Figure 3B:
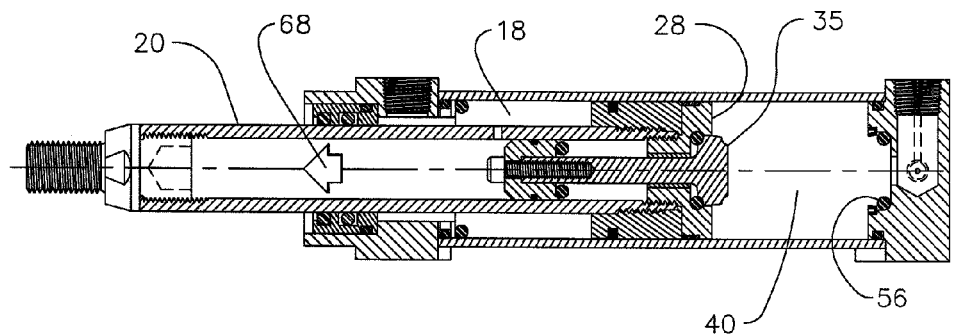
FIG. 3b is a partial cross-sectional view of the cylinder of FIG. 1 shown part way through the extend cycle.
Figure 3C:
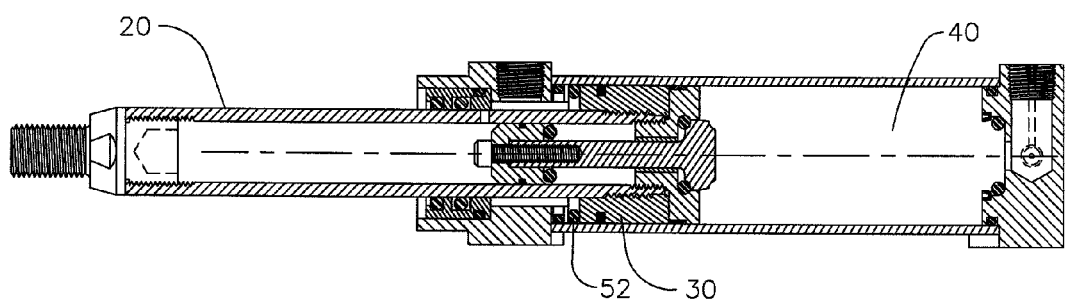
FIG. 3c is a partial cross-sectional view of the cylinder of FIG. 1 shown at the end of the extend cycle.

Operation of the invention will now be described by reference to FIGS. 3*a-c* and 4*a-c*. At the start of the extend cycle (FIG. 3*a*), pressurized air from an external source (not shown) is forced into the first chamber 40 through air supply port 57 and central bore 54 at the blind end 14 of the cylinder 10. At the same time, air supply port 9 is opened to allow venting of any air within second chamber 42. Initially, the pressurized air is forced directly on the head 35 of the cushion valve assembly, which is seated in central bore 54 and recess 48, forming a seal with lip seal 55 (shown in FIG. 1) and o-ring 58 as shown in FIG. 3*a*. However, as soon as the seal between the head 35 and the lip seal 55 has been broken, the pressurized air fills the first chamber 40, applying force against head 35 and main piston 28 in the direction of the rod end (as indicated by arrow 68) and thereby causing the cylinder rod 20 to extend out of the cylindrical chamber 18 (FIG. 3*b*). Pressurized air continues to be forced into chamber 40 until cylinder rod 20 has moved a pre-set distance, or until collar 30 comes into contact with piston bumper 52 (FIG. 3*c*).

Figure 4A:
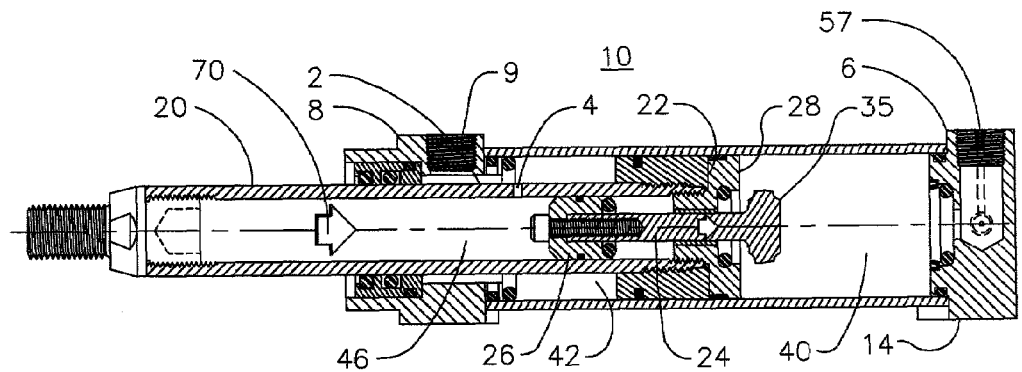
FIG. 4a is a partial cross-sectional view of the cylinder of FIG. 1 shown at the beginning of the return cycle.
Figure 4B:
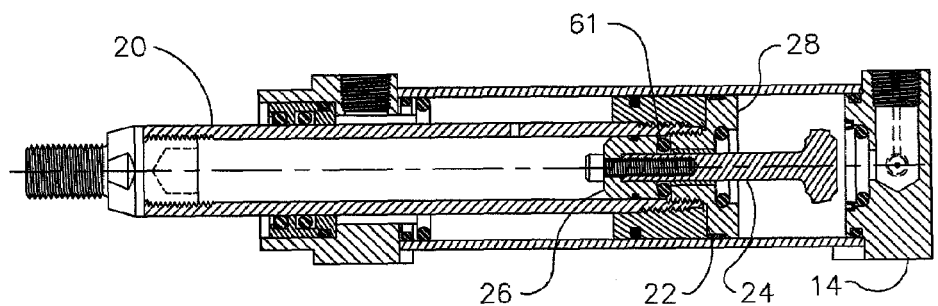
FIG. 4b is a partial cross-sectional view of the cylinder of FIG. 1 shown part way through the return cycle.

In the return cycle, pressurized air enters the second chamber 42 of the cylinder 10 through air supply port 9 in the cylinder head 8. At the same time, pressure is released from the first chamber 40 by venting the air through air supply port 57 in the cylinder head 6. The building pressure in the second chamber 42 forces piston assembly 22 (and the rod 20 to which it is attached) in the direction of arrow 70 toward the blind end 14. As shown in FIG. 4*a*, once the assembly has moved a given distance, the pilot hole 4 in the wall 2 of the cylinder rod 20 is exposed, allowing pressurized air in second chamber 42 to enter the third chamber 46 of the hollow cylinder rod 20. The air entering the third chamber 46 actuates the internal second piston 26, pushing the cushion valve assembly 24 relative to the piston 28, such that head 35 extends past the piston 28 towards blind end 14. The cushion valve assembly 24 ceases moving relative to the piston 28 once second piston 26 is in abutment with piston 28 (with o-ring 61 sandwiched therebetween), as shown in FIG. 4*b*.

Figure 4C:
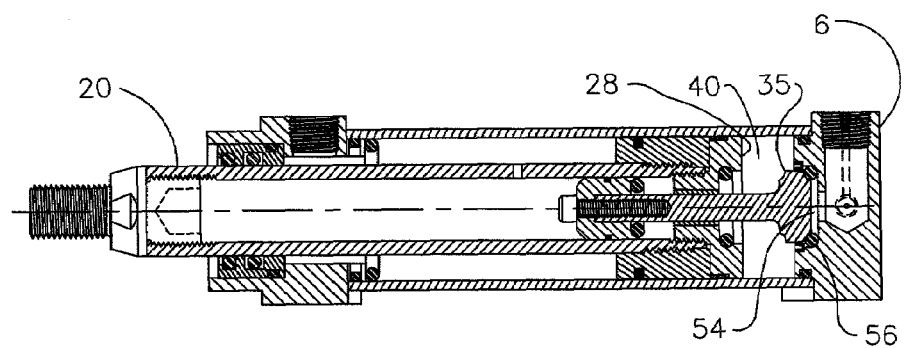
FIG. 4c is a partial cross-sectional view of the cylinder of FIG. 1 shown towards the end of the return cycle.

The piston assembly 22, cylinder rod 20 and cushion valve assembly 24 continue to move towards the blind end 14. Eventually, as shown in FIG. 4*c*, the head 35 is forced into central bore 54 forming a seal with lip seal 55 (shown in FIG. 1) thereby preventing the further release of air from the first chamber 40. The air trapped between the piston 28 and the blind end cylinder head 6 forces the entire piston assembly and rod 20 to come to a relatively soft stop. This prevents cylinder bounce, and prolongs the life of the piston assembly and blind end of the cylinder by minimizing the impact of the return cycle.

The use of a hollow cylinder rod 20 means the cylinder rod is lighter and can therefore move faster under the same air pressure as a solid cylinder rod of comparable diameter. The hollow cylinder may also be of a larger diameter, increasing the column strength of the cylinder rod and allowing the use of larger seals and gland bushing, which in turn extends the life of the cylinder.

Because there is no need for the pressure to build to a sufficient level to release the cushion sleeve from the floating cushion sleeve as is the case in the cylinders of the prior art, the present invention therefore allows for a faster cylinder response time as compared to the prior art cylinders having a cushion sleeve.

While use of the pneumatic cylinder has been described using air, it will be appreciated that other pressure producing mediums such as gases or liquids could also be used.

It will be appreciated by those skilled in the art that the preferred and alternative embodiments have been described in some detail but that certain modifications may be practiced without departing from the principles of the invention.

What is claimed is:

1. A pneumatic cylinder comprising:
    a tubular body having first and second ends and defining an interior chamber;
    a cylinder rod having a piston end and an actuation end, said cylinder rod being hollow and passing through an opening located in said first end of said tubular body such that said piston end is located within said interior chamber and said actuation end is located outside of said tubular body, said piston end of said cylinder rod having an external threaded surface and an internal threaded surface;
    a piston assembly, said piston assembly connected to said cylinder rod at said piston end and having a bore traveling longitudinally therethrough;
    a cushion valve assembly, said cushion valve assembly comprising an elongated rod having a head portion and a piston portion, said head and piston portions being at opposed ends of said elongated rod; and
    wherein said elongated rod is positioned within said bore for reciprocating action therein and said piston portion is positioned within said hollow cylinder rod.

2. The pneumatic cylinder of claim 1 wherein said piston assembly comprising a piston and a collar, said bore traveling longitudinally through said piston and said collar having an internally threaded surface adapted to be threadingly connected to said external threaded surface of said cylinder rod.

3. The pneumatic cylinder of claim 2 wherein said piston has a head and a neck, said neck being threaded and adapted to be threadingly connected to said internal threaded surface of said cylinder rod.

4. The pneumatic cylinder of claim 3 wherein said collar is in abutment with said piston, said collar being proximal to the actuation end of said cylinder rod as compared to said piston.

5. The pneumatic cylinder of claim 4 wherein said second end of said tubular body having a recess, said head portion of said elongated rod being adapted to fit within said recess to form a seal.

6. The pneumatic cylinder of claim 1 wherein said cylinder rod having a hole therein, said hole proximal to said actuation end of said cylinder rod as compared to said piston portion of said cushion valve assembly.

7. A pneumatic cylinder comprising:
    a tubular body having first and second ends and defining an interior chamber, said first end having an opening defined therein;
    a hollow cylinder rod having a pilot hole therein and having a piston at one end, said piston having a bore traveling longitudinally therethrough and adapted to be seated in said interior chamber for reciprocating action therein to move said cylinder rod back and forth through said opening in said first end;
    a cushion valve assembly comprising an elongated rod having a head portion and a piston portion, said head and piston portions being at opposed ends of said elongated rod, said elongated rod being positioned within said bore for reciprocating action therein, said piston portion being positioned within said hollow cylinder rod;
    wherein said cushion valve assembly being operatively connected to said piston for cushioning contact of said piston with said second end of said tubular body, said second end of said tubular body having a recess, said head portion being adapted to fit within said recess to form a seal; and wherein air forced into said interior chamber through said first end enters into said hollow cylinder rod through said pilot hole thereby exerting a pressure against said piston portion of said cushion valve assembly.

8. The pneumatic cylinder of claim 7 wherein said first and second ends are adapted for allowing the injection or venting of a pressure producing medium into the interior chamber.

9. The pneumatic cylinder of claim 8 wherein said interior chamber is separated by the piston and cushion valve assembly into a first and a second chamber.

10. The pneumatic cylinder of claim 9 wherein when the pressure within said first chamber is greater than in said second chamber, said cylinder rod being forced, by way of said piston, towards said second end, and said cushion valve assembly being forced to extend out from said hollow cylinder rod, such that said head portion coming into contact with said second end and adapted to form a seal with said second end so as to prevent the venting of said pressure producing medium from said second chamber.

* * * * *